May 24, 1966  H. L. BOWDITCH  3,252,383
DIFFERENTIAL PRESSURE MEASURING APPARATUS
Filed Oct. 19, 1956  3 Sheets-Sheet 2
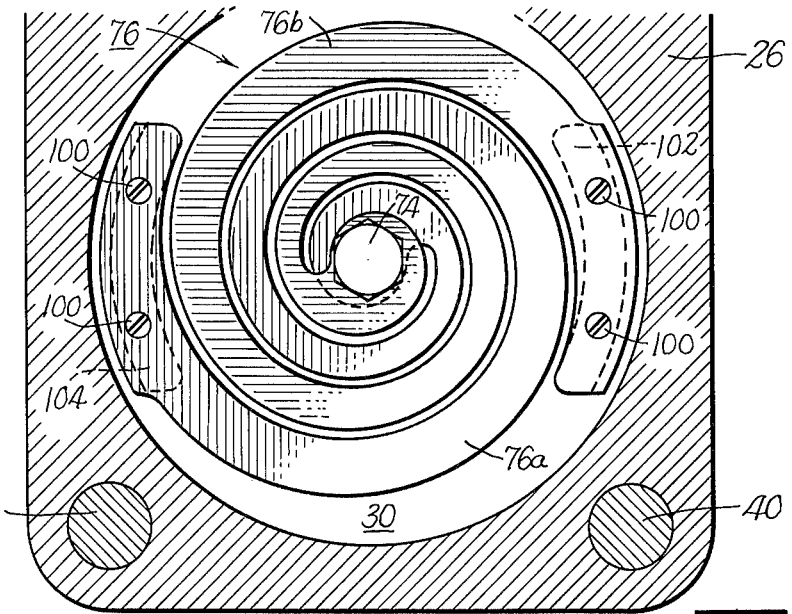
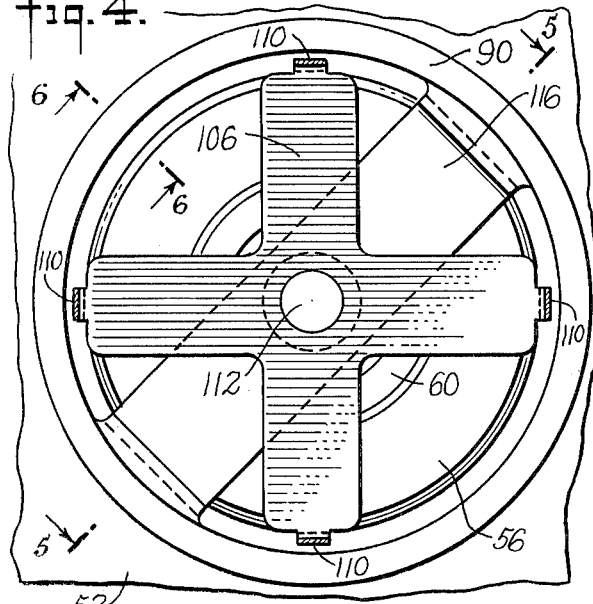
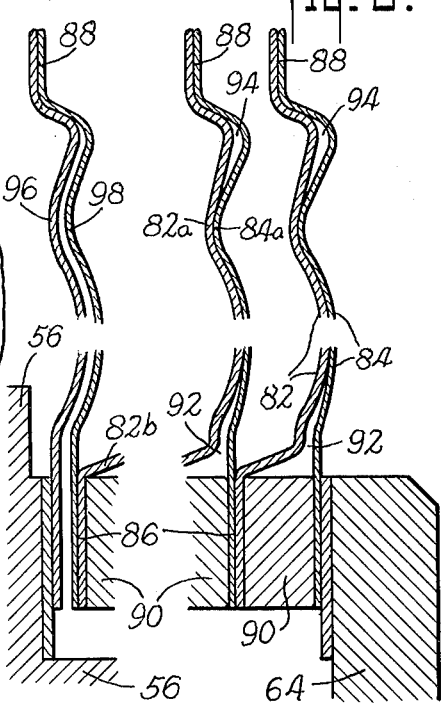
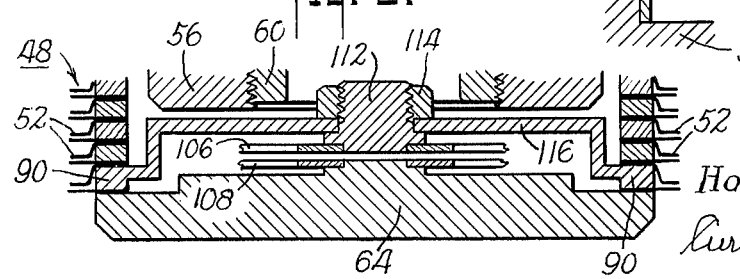
INVENTOR
Hoel L. Bowditch
BY
Curtis, Morris & Safford
ATTORNEYS

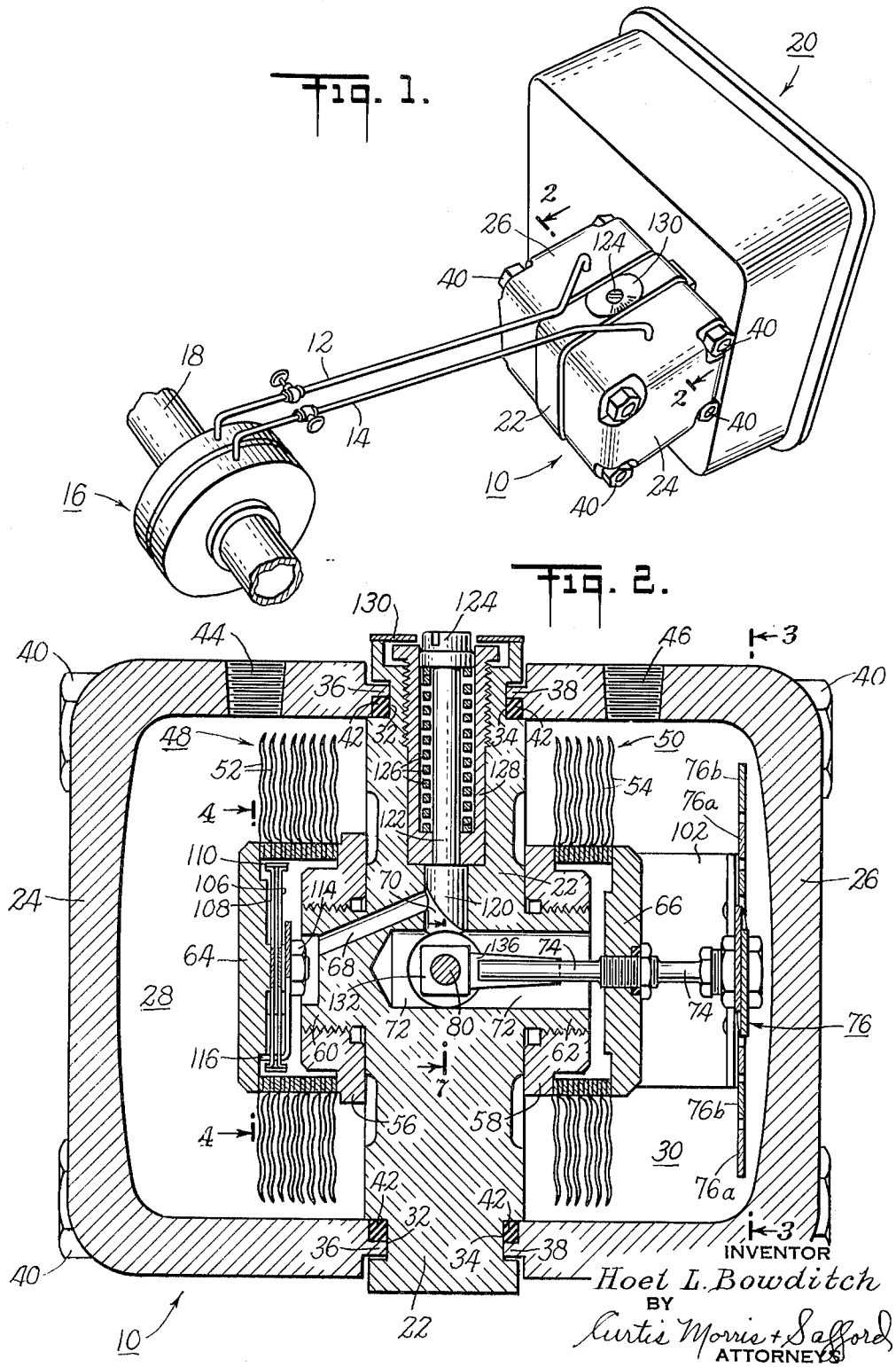

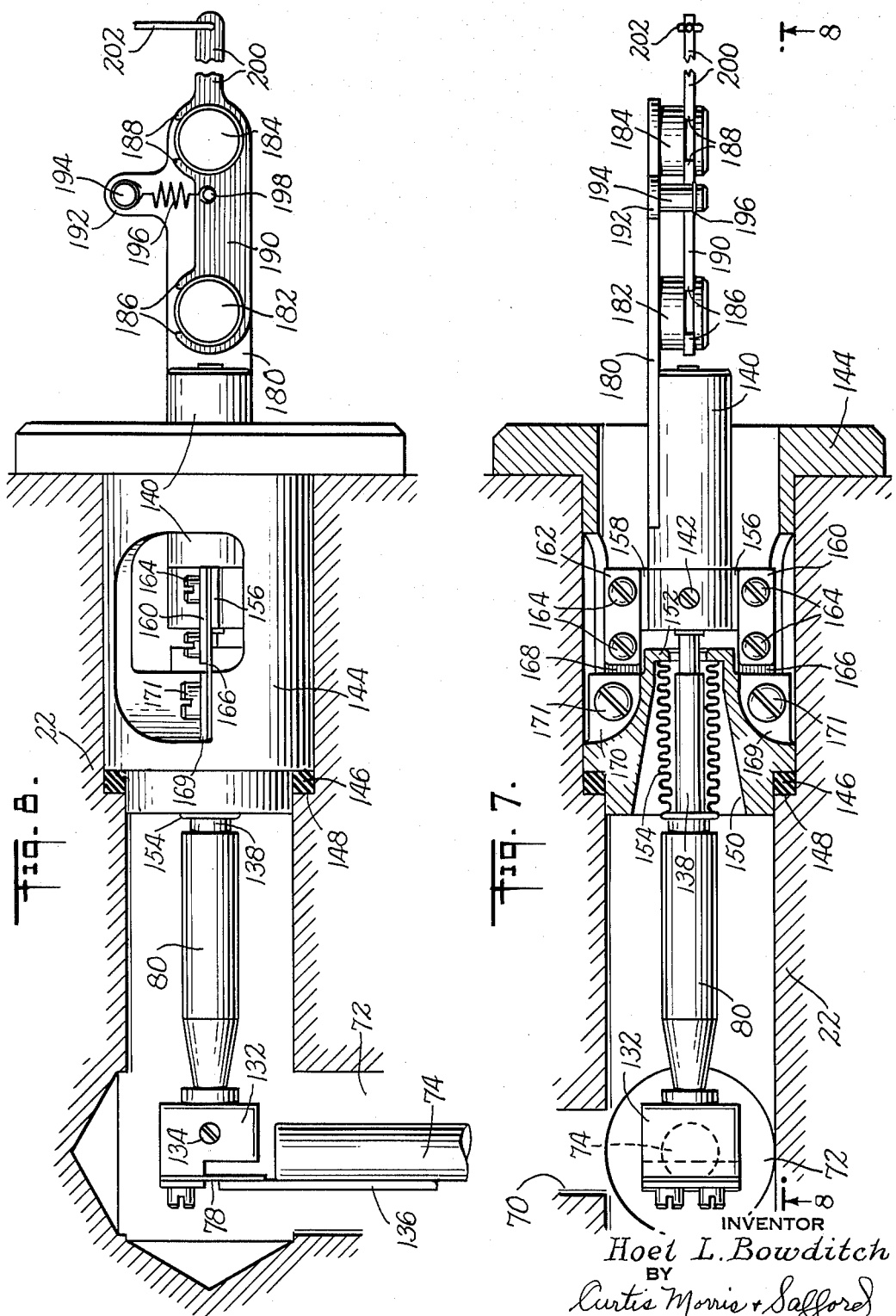

United States Patent Office 3,252,383
Patented May 24, 1966

3,252,383
DIFFERENTIAL PRESSURE MEASURING APPARATUS
Hoel L. Bowditch, Foxboro, Mass., assignor to The Foxboro Company, Foxboro, Mass., a corporation of Massachusetts
Filed Oct. 19, 1956, Ser. No. 617,199
18 Claims. (Cl. 92—1)

This invention relates to apparatus for measuring differential pressure. More particularly, this invention relates to differential-pressure flowmeters adapted for direct mechanical connection to an indicating device, e.g., to position the pen of a recording instrument in accordance with the rate of fluid flow.

Various types of differential-pressure flowmeters have, of course, been proposed heretofore. One type that has found widespread acceptance is the so-called "force-balance" arrangement, such as disclosed in my copending application Serial No. 453,632, filed on September 1, 1954 (now Patent 2,806,480), and which is adapted to produce a flow measurement signal (e.g. a pneumatic pressure) suitable for transmission to a remotely-located recording or control instrument. For certain applications, however, it is desirable to mount the flowmeter and the indicating or recording instrument together, and in this case the operating elements of the flowmeter can be connected directly to the pointer or pen arm of the instrument. Accordingly, the flowmeter in such an application advantageously may be a so-called "motion" device, e.g. having a pair of liquid-filled bellows with their interiors connected together by a passageway and their exterior subjected to the process pressures involved. The movement of the bellows is transmitted directly to the instrument pointer or pen arm to control the positioning thereof throughout its normal range of travel. The flowmeter to be described hereinbelow is of this general type.

In the use of such devices, the differential pressure being measured commonly is substantially less than the static pressure of the process flow line, for example a flowmeter operating at a static pressure of 1500 p.s.i. may be used to measure differentials of 100 inches of water or less. To measure such small differentials, the pressure-responsive elements must be highly sensitive, and the use of thin, fragile parts is required. However, since these parts might be exposed to the full static pressure of the flow line, as during an inadvertent overload condition, it is important that special provisions be made to assure that such parts are not damaged when the pressure differential exceeds the normal operating range.

A number of schemes have been proposed heretofore in an effort to solve this problem, but for various reasons these proposals have not been satisfactory. For example, it has been suggested that the bellows be filled with liquid and rigidly connected together, and that a valve be used to stop the transference of liquid between the bellows whenever one bellows is collapsed beyond its normal operating range. However, as a practical matter such valve arrangements tend to leak so that damage may result if the overrange persists for a long time. It also has been proposed to form the bellows from a series of diaphragms intended to nest together when subjected to overrange conditions, but the constructional arrangements used in these proposed devices have not been found to be satisfactory for equipment intended for industrial applications.

Another problem with devices of this character that has not properly been solved heretofore is the effect produced by ambient temperature variations. That is, the liquid within the bellows tends to vary in volume with changes in temperature, and provision should be made to compensate for this effect so as to prevent errors in flow measurement. Also, the mechanism used to transmit the motion of the bellows through the pressure-tight casing of the flowmeter should be arranged so that no measurement errors are introduced by static pressure variations within the casing.

Accordingly, it is an object of the present invention to provide differential-pressure measuring apparatus that is superior to such apparatus provided heretofore. It is a further object of this invention to provide a differential-pressure flowmeter wherein the problems set forth above and related problems are solved by novel constructional arrangements. Other objects, aspects and advantages of the present invention will be in part pointed out in, and in part apparent from, the following description of a preferred embodiment of the invention, considered together with the accompanying drawings, in which:

FIGURE 1 is a perspective view of a flowmeter constructed in accordance with the present invention, shown mounted on the rear panel of a conventional recording instrument;

FIGURE 2 is a cross-section of the flowmeter, taken along line 2—2 of FIGURE 1;

FIGURE 3 is a vertical section taken along line 3—3 of FIGURE 2, showing particularly the spiral range control spring;

FIGURE 4 is a vertical section taken along line 4—4 of FIGURE 2, showing particularly the temperature-sensitive compensator unit;

FIGURE 5 is a section taken along line 5—5 of FIGURE 4, showing further details of the compensator unit;

FIGURE 6 is a section taken along line 6—6 of FIGURE 4, showing details of the bellows construction;

FIGURE 7 is a vertical section taken along line 7—7 of FIGURE 2, showing the motion take-off mechanism; and FIGURE 8 is a section taken along line 8—8 of FIGURE 7, showing further details of the motion take-off mechanism.

Referring now to FIGURE 1, a flowmeter generally indicated at 10 is connected by two conduits 12 and 14 to a conventional orifice-plate primary device 16 mounted on a flow pipe 18 and adapted to produce a pressure differential in accordance with the rate of fluid flow through the pipe. The flowmeter 10 is mounted on the rear panel of a conventional recording instrument 20, and is mechanically linked to a movable pen (not shown) in this instrument so as to produce a graphic representation of the rate of fluid flow.

The flowmeter 10 includes a central body member 22 (see also FIGURE 2) and a pair of end caps 24 and 26 which are mounted on opposite sides of the central body to form a pair of pressure chambers 28 and 30. As shown in FIGURE 2, the body 22 is formed along both sides thereof with grooves 32 and 34 arranged to receive corresponding tongues 36 and 38 formed on the adjacent edges of the end caps. The end caps are secured to the body by tie-bolts 40 which extend through holes (not shown) at the four corners of the body, and which clamp the end caps firmly against gaskets 42 in the grooves 32 and 34 so as to provide a tight pressure seal for the chambers 28 and 30. The conduits 12 and 14 are connected to these pressure chambers through openings 44 and 46 in the end caps, so that the chambers are pressurized in accordance with the upstream and downstream pressures at the primary device 16. It will thus be apparent that the pressure differential between the chambers 28 and 30 is determined by the rate of fluid flow through the pipe 18.

To convert this pressure differential to mechanical motion, there is provided in the left-hand pressure chamber 28 an expansion bellows generally indicated at 48, and in the right-hand pressure chamber 30 there is provided a measurement bellows generally indicated at 50. These bellows have equal effective areas, and each comprises a number of convolutions 52 and 54 the detailed construction of which will be set forth more fully hereinbelow. The bellows are secured in a pressure-tight seal to mounting plates 56 and 58, respectively, which are threaded onto corresponding bosses 60 and 62 forming part of the central body 22. Rigid plates 64 and 66 are secured to the outer ends of the bellows so that the bellows interiors are sealed off from the pressure chambers 28 and 30.

The interior of the expansion bellows 48 communicates with the interior of the measurement bellows 50 along a channel through the body 22 which comprises an offset passageway 68, a vertical passageway 70, and a horizontal passageway 72. The bellows and the communicating passageways are filled with an incompressible liquid, e.g. kerosene. It will be apparent that when there is no pressure difference between the chambers 28 and 30, the resulting compression forces exerted by the two bellows on the liquid will be equal and opposite. However, if for example the pressure in chamber 28 is increased to exceed that in chamber 30, the bellows 48 will be compressed and force some of the liquid through the connecting channel to expand the other bellows 50, and vice versa.

The bellows 48 and 50 are constructed in such a way that they are relatively "limp," i.e. they develop essentially no spring force as they are expanded or compressed. However, since it is desired that the positioning of these bellows accurately reflect the pressure differential between the chambers 28 and 30, calibrated spring means are provided for the measurement bellows 50.

For this purpose, the end-plate 66 of the measurement bellows 50 is connected by a shaft 74 threadedly engaged therewith to the central portion of a thin, planar range spring generally indicated at 76 (to be described more fully hereinbelow with reference to FIGURE 3). This spring is arranged to apply a force to the end plate in opposition to the force developed by the pressure differential between the chambers, so that the end plate will take a position determined both by the amount of pressure differential and the spring rate of the spring 76. The spring rate is selected in accordance with the range of differentials to be measured; the range of the instrument may be simply changed by substituting a different spring.

The end-plate shaft 74 extends interiorly of the measurement bellows 50 into the central passageway 72, and is connected there by a flexure 78 (FIGURE 8) to a motion take-off rod 80 mounted at right angles to the shaft 74. This rod passes through a pressure-tight seal in the casing of the flowmeter and extends into the recording instrument 20 (FIGURE 1) where it is connected by a conventional linkage mechanism (not shown) to the movable pen of that instrument. As explained above, the positioning of the shaft 74 represents a direct measure of the rate of fluid flow through the pipe 18, and this positioning is transmitted through the take-off rod 80 to the recording instrument 20 so as to produce a visual record of this rate of flow.

Turning now to the details of construction of the bellows 48 and 50, and referring particularly to FIGURE 6, it can be seen that each convolution of the bellows comprises a pair of centrally-apertured diaphragms 82 and 84 joined together alternatively at the inner and outer rims thereof as indicated at 86 and 88 respectively. In accordance with one aspect of the present invention, this joint is made by stitch-welding (i.e. overlapped spot-welding) the diaphragms directly together without the interposition of any other member. This type of joint is particularly advantageous in that the welding takes place between elements which are relatively thin, thereby assuring a positive seal and good strength.

To prevent damage to the bellows under overrange conditions, e.g. if one of the pressure chambers 28 and 30 is inadvertently exhausted to atmosphere, the bellows are provided with a number of support rings 90. Each ring is located between two diaphragms (e.g. 82, 84) which together form a diaphragm unit or convolution, and the rings are spot-welded to one of these diaphragms 82. When the bellows collapse under overrange conditions, the support rings and the inner rims of the diaphragms all seat together to form an effectively solid stack abutting the corresponding mounting plates 56 or 58. Thus, the sensitive diaphragms are protected from distortion and damage which might otherwise result from the high static pressures in the pressure chambers 28 or 30.

An additional problem encountered in forming a bellows from a series of thin diaphragms is that the high pressures encountered during overrange conditions tend to squeeze the diaphragm pairs together and produce wrinkling. This problem is solved in accordance with another aspect of the present invention by forming the diaphragms and the support rings 90 in such a way that, when the rings and diaphragms are seated tightly together, the diaphragms of each pair are separated by a small space (.005 to .01") in the regions 92 thereof adjacent the support rings. It can be seen that one of the diaphragms 82 is formed with a gentle bend over the outer face of the corresponding support ring 90 and towards the other diaphragm 84. With this arrangement, the portion of the diaphragm 82 adjacent the support ring will be maintained in tension under overrange conditions so as to avoid any tendency toward wrinkling such as occurs if the diaphragm is under compression.

A similar arrangement is employed in securing together the outer rims of the diaphragms. That is, the outer rims of the diaphragm pair 82, 84 are formed in zig-zag fashion so as to provide a small lateral spacing therebetween (.005 to .01") as indicated at 94. This small spacing, in conjunction with the spacing 92, described above, assures a positive, i.e. unchanging, effective area throughout the entire calibrated stroke of the unit and also retains the collapsed overrange protection.

The central portions of the diaphragms i.e. between the spaced-apart regions 92, 94, are nested closely together under overrange conditions. The innermost diaphragm pair 96, 98 is, however, shown positioned for normal operating conditions, to indicate that the individual diaphragms are spaced apart throughout the full extent thereof under these conditions.

The range spring 76, mentioned briefly above in connection with the bellows end-plate 66, is shown most clearly in FIGURE 3. It can be seen that this spring comprises a pair of inter-fitted spiral elements 76a and 76b each fastened at its outer end by bolts 100 to a corresponding mounting plate 102, 104 (see also FIGURE 2). These mounting plates extend alongside the measurement bellows 50 adjacent the periphery of the convolutions 54 and are anchored to the central body 22. The inner ends of the spiral elements are overlapped and fastened together to the shaft 74.

With this arrangement, the spring provides substantial support for the shaft 74 in a direction transverse to the axis of the bellows 50, and this support is independent of the position in which the flowmeter 10 is mounted. Further, this arrangement provides at the same time a uniformly calibrated spring rate throughout the range of movement of the end-plate 66 in a direction parallel to the axis of the bellows 50. Also, it will be apparent that the spring may readily be replaced with a similar spring but of different spring rate (for purposes of changing the measurement range of the flowmeter), since access to the spring may be obtained merely by removing the right-hand end cap 26.

Although the convolutions 52 and 54 of the two bellows 48 and 50 are purposely made so as to have substantially no springiness, it is not possible as a practical matter to completely eliminate spring effect in the bellows. Consequently, any change in volume of the liquid within the bellows due to changes in ambient temperature tends to affect the calibration of the instrument.

To avoid this difficulty, in accordance with another aspect of the present invention there is provided within the expansion bellows 48 a temperature compensation mechanism comprising (referring now to FIGURES 4 and 5) a pair of cross-shaped elements 106 and 108 having their outer ends joined together by straps 110. These elements are formed of materials having different co-efficients of thermal expansion so that the space between the centers thereof changes in response to variations in ambient temperature. The center of the inner element 106 is secured by means of a threaded shaft 112 and a nut 114 to an offset bracket 116, the remote ends of which are fastened to the outermost support ring 90 of the bellows. The center of the other element 108 is fastened directly to the center of the end plate 64. Thus, if the temperature increases the resulting motion of the bimetallic elements 106 and 108 will increase the spacing between the outermost support ring 90 and the end plate 64 so as to spread open the outermost convolution of the bellows. This temperature compensation mechanism is so arranged that the change in volume of this convolution is substantially equal to the change in volume of the liquid within the bellows, for a given change in temperature. Accordingly, the remainder of the convolutions of the two bellows are not affected by any change in volume of the liquid, and hence the instrument is essentially free from errors due to ambient temperature changes.

In certain applications, it is desirable to restrict the flow of liquid between the two bellows 48 and 50 so as to provide a damping effect. Advantageously, this damping effect should be readily adjustable from outside the instrument. Referring now to FIGURE 2, this is accomplished in accordance with another aspect of the present invention by a damping plug 120, the lower end of which extends into the vertical passageway 70. This end is truncated along a plane canted at an angle with respect to the axis of the plug so as to form a tapered tip. Thus, as the plug is rotated about its axis, this tapered tip correspondingly varies the opening between the offset passageway 68 and the vertical passageway 70, and thereby alters the degree of restriction placed on the flow of liquid between the two bellows 48 and 50.

The plug 120 is mounted on the lower end of a shaft 122 positioned in a vertical passageway extending out to the side of the central body 22, and is provided with a slotted screw head 124 in its remote end to facilitate ready adjustment. Surrounding this shaft is a helical spring 126, the upper end of which bears against the screw head 124 and the lower end of which bears against an interior shoulder of a mounting sleeve 128 threadedly engaged with the body member 22. A circular dial-plate 130 surrounds the screw head 124 to aid in accurate setting of the damping adjustment.

As mentioned hereinabove, lateral motion of the bellows end plate 66 is transmitted through the shaft 74 and the take-off rod 80 to the recording instrument 20. Referring now to FIGURES 7 and 8, it can be seen that the inner end of this rod is connected to an L-shaped block 132 by a set screw 134, and the block is bolted to the flexure 78 which is fastened at its other end to a plate 136 secured to one side of the shaft 74. The rod 80 is formed at its outer end with a reduced-diameter extension 138 which is fitted within the axial bore of a tube 140 and secured in place by a set screw 142.

Both the tube 140 and the extension 138 are located within the interior of a flange member 144 which seats against a gasket 146 abutting a shoulder 148 formed in the interior of the flowmeter body 22, so as to establish a pressure-tight seal therebetween. The inner portion of this flange body is formed with a tapered axial opening 150 terminating in a circular shoulder 152. A small bellows 154 is positioned around the rod extension 138 within this opening 150, and is brazed at one end to the shoulder 152 and at its other end to the rod extension. Thus, motion of the take-off rod 80 may be transmitted through a pressure-tight seal provided by the bellows 154.

The tube 140 is provided with a pair of radial fins 156, 158 extending out on opposite sides thereof, and which are secured by means of rigid plates 160, 162 and bolts 164 to a corresponding pair of flexure strips 166, 168. The other ends of these flexures are fastened by rigid plates 169, 170 and bolts 171 to flat surfaces formed on opposite sides of the flange member 144. These flat surfaces are precision machined such that the flexures 166, 168 lie in a common plane passing through (i.e. within 0.01″) the longitudinal axis of the rod extension 138.

It will be apparent from the above that the parallel flexures 166, 168 serve to establish a pivot axis for motion of the take-off rod 80. Further, since this axis passes through the rod axis, the force exerted longitudinally along the rod by the static pressure acting on the effective area of the bellows 154 will produce equal and opposite torques about the rod pivot axis. Hence, the positioning of the take-off rod is not disturbed by changes in these torques due to variations in static pressure.

When a rod passing through a bellows seal is tipped at an angle with respect to the normal axis of the bellows, however, there is a tendency for a reactive torque to develop even though the pivot axis passes through the center of the rod. The amount of this reactive torque depends upon the static pressure within the flowmeter, and hence the flowmeter calibration can be adversely affected by static pressure variations. This problem has been solved in accordance with another aspect of the present invention by locating the pivot axis at a position relative to the longitudinal axis of the bellows such that effectively no reactive torque is produced when the rod is tipped.

In the embodiment described herein, the rod pivot axis is located between the ends of the bellows 154, and near the end thereof which is sealed to the circular shoulder 152. The flexible portions of the flexures 166, 168 are made short relative to the length of the bellows, so as to provide a pivot axis that is sharply defined in position along the bellows axis. With this arrangement, variations in static pressure will not produce corresponding changes in torque on the rod 80 when the rod is tipped at an angle, i.e. away from the position shown in the drawings. However, if the pivot axis established by the flexure pair were moved to a different point longitudinally of the bellows, there would be changes in torque on the rod due to variations in static pressure, and the direction of such torques would be determined by the direction in which the pivot axis had been shifted along the bellows axis away from the location shown in the drawings.

Returning now to the constructional details of the motion take-off mechanism, there is welded to the tube 140 a plate 180 having a pair of cylindrical buttons 182, 184 mounted thereon with their centers aligned with the tube axis. These buttons are grooved around their periphery to receive the loosely fitting arms 186, 188 of a flat link 190 adapted to provide protection from overrange conditions. The plate 180 is formed with an upstanding tab 192 having a pin 194 to which is secured a coiled spring 196 which extends down to a pin 198 on the link 190 and is suitably tensioned to hold the link firmly against the buttons 182, 184 during normal operation of the flowmeter.

The remote end 200 of the link 190 is secured to a wire 202 which is connected to a conventional pendrive linkage mechanism (not shown) in the recording instrument 20. It will be apparent that if the plate 180 moves the link 190 to the limit of travel of the pen, i.e. up against the stops in the recording instrument, any further movement of the plate will merely pivot the link about one of the buttons 182, 184 against the tension of the spring 196. Consequently, there will be no damage to the recorder if the flowmeter responds to a flow rate beyond the selected range of the instrument.

The pen-drive linkage mechanism in the recording instrument 20 is arranged to convert the effectively straight-line motion of the link 190 to a rotary motion of the pen across the face of the circular chart used with such recorders. As is well known, conventional linkage mechanisms of this type introduce a slight deviation from linearity in converting from straight-line motion to rotary motion. Commonly, the linkage is adjusted so that the deviation is zero at the extreme limits of pen travel and zero at the center point of pen travel, thereby giving what is termed an "S-curve" calibration. It has been found that the opposed-bellows arrangement used in the apparatus disclosed herein also produces a slight deviation from linearity in converting from differential-pressure to output motion of the rod 80, and this latter deviation is approximately equal to, but in a direction opposite to, that produced by the pen linkage mechanism. Accordingly, the two deviations tend to cancel thereby producing substantially linear pen motion for changes in differential pressure regardless of where the pen is on the scale.

Although a specific preferred embodiment of the invention has been set forth in detail, it is desired to emphasize that this is not intended to be exhaustive or necessarily limitative; on the contrary, the showing herein is for the purpose of illustrating one form of the invention and thus to enable others skilled in the art to adapt the invention in such ways as meet the requirements of particular applications, it being understood that various modifications may be made without departing from the scope of the invention as limited by the prior art.

I claim:

1. Differential-pressure responsive apparatus adapted for use as a flowmeter and comprising, in combination, first and second pressure chambers disposed adjacent one another, means for supplying fluid under pressure to said chambers so as to permit a pressure-differential to be established therebetween, first and second bellows located in said chambers respectively and subjected externally to the pressures therein, each of said bellows comprising a plurality of centrally-apertured diaphragms positioned side-by-side and secured together alternately at their inner and outer rims in direct rim-to-rim contact to form a series of expansible diaphragm units each consisting of two of said diaphragms, a plurality of support rings for said bellows, each of said rings being positioned within a corresponding one of said units and secured to the inner rim of one of the diaphragms thereof, a passageway for establishing communication between said bellows, said bellows and said passageway being sealed off from said chambers and filled with liquid, and a motion take-off device coupled to one of said bellows for producing externally of said apparatus an indication of the amount of pressure differential between said chambers.

2. Differential-pressure responsive apparatus adapted for use as a flowmeter and comprising, in combination, first and second pressure chambers disposed adjacent one another, first and second conduits for supplying fluid under pressure to said chambers respectively to permit a pressure-differential to be established therebetween, first and second bellows located in said chambers respectively and subjected externally to the pressures therein, each of said bellows comprising a plurality of centrally-apertured diaphragms positioned side-by-side and welded together alternately at their inner and outer rims in direct rim-to-rim contact to form a series of expansible diaphragm units each consisting of a pair of said diaphragms, a plurality of support rings for said bellows, each of said rings being positioned within a corresponding one of said units and secured to the inner rim of one of the diaphragms thereof whereby said rings and inner rims seat together when said bellows are collapsed by external pressure, one diaphragm of each of said diaphragm pairs being curved in the region adjacent the inner rim thereof and such that the individual diaphragms of each pair are separated by a small distance in said region when said bellows are collapsed, a passageway for establishing communication between said bellows, said bellows and said passageway being sealed off from said chambers and filled with a substantially incompressible liquid, and a motion take-off device coupled to one of said bellows for producing an indication of the amount of pressure differential between said chambers.

3. Differential-pressure responsive apparatus adapted for use as a flowmeter comprising, in combination, first and second pressure chambers disposed adjacent one another, means for supplying fluid under pressure to said chambers so as to permit a pressure-differential to be established therebetween, first and second bellows located in said chambers respectively and subjected externally to the pressures therein, each of said bellows comprising a plurality of centrally-apertured diaphragms positioned side-by-side and secured together alternately at their inner and outer rims in direct rim-to-rim contact to form a series of expansible diaphragm units each consisting of a pair of two diaphragms, a plurality of support rings for said bellows, each of said rings being positioned within a corresponding one of said units and secured to one of the diaphragms thereof so that said rings and inner rims seat together when said bellows are collapsed by external pressure, one diaphragm of each of said pairs being bent gently over the corresponding ring towards the other diaphragm in the region adjacent the inner rim thereof, the thickness of said rings being such that said rings and inner rims seat before any contact takes place between said diaphragms in said region, whereby said diaphragms are maintained in tension throughout said region, a passageway for establishing communication between said bellows, said bellows and said passageway being sealed off from said chambers and filled with liquid, and a motion take-off device coupled to one of said bellows for producing an indication of the amount of pressure differential between said chambers.

4. Differential-pressure responsive apparatus adapted for use as a flowmeter and comprising, in combination, first and second pressure chambers disposed adjacent one another, means for supplying fluid under pressure to said chambers so as to permit a pressure-differential to be established therebetween, first and second bellows located in said chambers respectively and subjected externally to the pressures therein, a passageway for establishing communication between said bellows, first and second end plates for said bellows respectively and secured to the ends thereof remote from said passageway, said bellows and said passageway being sealed off from said chambers and filled with liquid, a motion take-off device coupled to one of said bellows for producing externally of said apparatus an indication of the amount of pressure differential between said chambers, a range control spring connected to the end plate of said one bellows and located externally of said one bellows to permit ready access to said spring for replacement thereof to change the operating range of said apparatus, said spring comprising a pair of planar elements each having one end connected to said bellows end plate and extending away therefrom at right angles with respect to the longitudinal axis of said one bellows, and mounting means for said spring secured to the interior surface of the pressure chamber in which said one bellows is located.

5. Differential-pressure responsive apparatus adapted for use as a flowmeter and comprising, in combination, a casing having first and second pressure chambers disposed adjacent one another, means for supplying fluid under pressure to said chambers so as to permit a pressure-differential to be established therebetween, first and second bellows located in said chambers respectively and subjected externally to the pressures therein, a passageway for establishing communication between said bellows, first and second end plates for said bellows respectively and secured to the ends thereof remote from said passageway, said bellows and said passageway being sealed off from said chambers and filled with liquid, a motion take-off device coupled to one of said bellows for producing externally of said apparatus an indication of the amount of pressure differential between said chambers, a range control spring connected to the end plate of said one bellows and located externally of said one bellows to permit ready access to said spring for replacement thereof to change the operating range of said apparatus, said spring comprising a pair of planar elements each having one end connected to said bellows end plate and extending away from said end plate in opposite directions within a plane transverse to the axis of said one bellows, each of said elements consisting of a series of consecutive sections with said sections disposed athwart a line joining the ends of the element, and mounting means in the interior of said casing and connected to the remote ends of said spring elements.

6. Differential-pressure responsive apparatus adapted for use as a flowmeter and comprising, in combination, a casing having first and second pressure chambers disposed adjacent one another, means for supplying fluid under pressure to said chambers so as to permit a pressure-differential to be established therebetween, first and second bellows located in said chambers respectively and subjected externally to the pressures therein, a passageway for establishing communication between said bellows, first and second end plates for said bellows respectively and secured to the ends thereof remote from said passageway, said bellows and said passageway being sealed off from said chambers and filled with liquid, a motion take-off device coupled to one of said bellows for producing externally of said apparatus an indication of the amount of pressure differential between said chambers, a range control spring connected to the end plate of said one bellows and located externally of said one bellows to permit ready access to said spring for replacement thereof to change the operating range of said apparatus, said spring comprising a planar spiral member with its inner end connected to said bellows end plate and extending away therefrom in a plane perpendicular to the longitudinal axis of said one bellows, and mounting means in the interior of said casing and secured to the outer end of said spiral spring.

7. Differential-pressure responsive apparatus adapted for use as a flowmeter and comprising, in combination, a casing having first and second pressure chambers disposed adjacent one another, means for supplying fluid under pressure to said chambers so as to permit a pressure-differential to be established therebetween, first and second bellows located in said chambers respectively and subjected externally to the pressures therein, a passageway for establishing communication between said bellows, first and second end plates for said bellows respectively and secured to the ends thereof remote from said passageway, said bellows and said passageway being sealed off from said chambers and filled with liquid, a motion take-off device coupled to one of said bellows for producing externally of said apparatus an indication of the amount of pressure differential between said chambers, a range control spring connected to the end plate of said one bellows and located externally of said one bellows to permit ready access to said spring for replacement thereof to change the operating range of said apparatus, said spring comprising a pair of interfitted spiral elements lying substantially in a common plane perpendicular to the longitudinal axis of said one bellows, the inner ends of said elements being connected to said end plate, and a pair of mounting members disposed on opposite sides of said one bellows and connected respectively to the outer ends of said spiral elements.

8. Differential-pressure responsive apparatus adapted for use as a flowmeter and comprising, in combination, first and second pressure chambers disposed adjacent one another, means for supplying fluid under pressure to said chambers so as to permit a pressure-differential to be established therebetween, first and second bellows located in said chambers respectively and subjected externally to the pressures therein, each of said bellows comprising a plurality of side-by-side convolutions and an end plate, a passageway for establishing communication between said bellows, said bellows and said passageway being sealed off from said chambers and filled with liquid, a temperature-sensitive member immersed in the liquid in one of said bellows and operatively connected at one side thereof to the end plate of said one bellows, a rigid member within said one bellows, said rigid member being constructed and arranged to engage one of the convolutions of said one bellows, the other side of said temperature-sensitive member being connected to said rigid member, said temperature-sensitive member being operable in response to changes in the temperature of said liquid to shift said rigid member towards and away from the end plate of said one bellows in such a manner as to force said convolution to open wider in response to a rise in temperature of said liquid, whereby the interior volume of said bellows is increased an amount equal to the increase in volume of said liquid due to said temperature rise, and a motion take-off device coupled to one of said bellows for producing externally of said apparatus an indication of the amount of pressure differential between said chambers.

9. Differential-pressure responsive apparatus adapted for use as a flowmeter and comprising, in combination, first and second pressure chambers disposed adjacent one another, means for supplying fluid under pressure to said chambers so as to permit a pressure-differential to be established therebetween, first and second bellows located in said chambers respectively and subjected externally to the pressures therein, each of said bellows comprising a plurality of side-by-side convolutions, a passageway for establishing communication between said bellows, said bellows and said passageway being sealed off from said chambers and filled with liquid, a temperature-sensitive member immersed in the liquid in one of said bellows and operatively connected to at least one of the convolutions thereof to force the walls of said convolution farther apart in response to a rise in temperature of said liquid, said member comprising a bi-metallic element having two strips of metal of different thermal coefficients of expansion, said strips being connected together adjacent the ends thereof so that the positioning of said strips varies with changes in temperature of said liquid and controls the spreading of said convolution whereby the interior volume of said bellows is altered an amount equal to the change in volume of said liquid due to said temperature change, and a motion take-off device coupled to one of said bellows for producing externally of said apparatus an indication of the amount of pressure differential between said chambers.

10. Differential-pressure responsive apparatus adapted for use as a flowmeter and comprising, in combination, first and second pressure chambers disposed adjacent one another, means for supplying fluid under pressure to said chambers so as to permit a pressure-differential to be established therebetween, first and second bellows located in said chambers respectively and subjected externally to the pressures therein, each of said bellows comprising a plurality of centrally-apertured diaphragms positioned side-by-side and secured together alternately at their inner and outer rims to form a series of expansible diaphragm units each consisting of two of said diaphragms, a plurality of support rings for said bellows and secured to said inner rims, a passageway for establishing communication between said bellows, first and second end plates for said bellows respectively, said bellows and said passageway being sealed off from said chambers and filled with liquid, a temperature-sensitive bi-metallic structure positioned within one of said bellows and operatively connected between one of said rings and the bellows end plate to vary the spacing between said one ring and the bellows end plate, the resulting change in volume of said bellows due to a variation in temperature being substantially equal to the corresponding change in volume of said liquid, and a motion take-off device coupled to one of said bellows for producing externally of said apparatus an indication of the amount of pressure differential between said chambers.

11. Differential-pressure responsive apparatus adapted for use as a flowmeter and comprising, in combination, first and second pressure chambers disposed adjacent one another, means for supplying fluid under pressure to said chambers so as to permit a pressure-differential to be established therebetween, first and second bellows located in said chambers respectively and subjected externally to the pressures therein, each of said bellows comprising a plurality of side-by-side convolutions, a passageway for establishing communication between said bellows, first and second end plates for said bellows respectively, said bellows and said passageway being sealed off from said chambers and filled with liquid, a temperature-sensitive member positioned within one of said bellows and comprising a pair of cross-shaped elements formed of materials having different coefficients of thermal expansion, said elements being positioned side-by-side with their corresponding ends fastened together so that the spacing between said elements varies with changes in temperature of said liquid, means operatively connecting the central portion of one of said elements to the end plate of said one bellows, means operatively connecting the central portion of the other element to one of said convolutions whereby any variation in spacing between said elements will correspondingly vary the spacing between said one convolution and the bellows end plate, the resulting change in volume of said bellows due to a variation in temperature being substantially equal to the corresponding change in volume of said liquid, and a motion take-off device coupled to one of said bellows for producing externally of said apparatus an indication of the amount of pressure differential between said chambers.

12. Differential-pressure responsive apparatus adapted for use as a flowmeter and comprising, in combination, a casing having first and second pressure chambers disposed therein adjacent one another, means for supplying fluid under pressure to said chambers so as to permit a pressure-differential to be established therebetween, first and second bellows located in said chambers respectively and subjected externally to the pressures therein, a passageway for establishing communication between said bellows, said bellows and said passageway being sealed off from said chambers and filled with liquid, an opening in said casing, a rod extending through said opening and having its inner end operatively coupled to one of said bellows to move therewith in response to changes in the pressure differential between said chambers, a third bellows positioned in said opening and surrounding said rod, one end of said third bellows being secured to said casing with the other end of said third bellows being secured to said rod to form a pressure-tight seal around said casing opening, support structure connected to said rod for establishing a pivot axis transverse to the rod axis and about which said rod is movable in response to movement of said one bellows, said pivot axis being located at a point along the longitudinal axis of said rod such that there is effectively no change in torque on said rod about said pivot axis due to variations in static pressure within said casing.

13. Differential-pressure responsive apparatus adapted for use as a flowmeter and comprising, in combination, a casing having first and second pressure chambers disposed therein adjacent one another, means for supplying fluid under pressure to said chambers so as to permit a pressure-differential to be established therebetween, first and second bellows located in said chambers respectively and subjected externally to the pressures therein, a passageway for establishing communication between said bellows, said bellows and said passageway being sealed off from said chambers and filled with liquid, an opening in said casing, a rod extending through said opening and having its inner end operatively coupled to one of said bellows to move therewith in response to changes in the pressure differential between said chambers, a third bellows positioned in said opening and surrounding said rod, one end of said third bellows being secured to said casing with the other end of said third bellows being secured to said rod to form a pressure-tight seal around said casing opening, support structure connected to said rod externally of said casing for establishing a pivot axis transverse to the rod axis and about which said rod is movable in response to movement of said one bellows, said pivot axis being located at a point along the longitudinal axis of said rod intermediate the ends of said third bellows and such that there is effectively no change in torque on said rod about said pivot axis due to variations in static pressure within said casing.

14. Differential-pressure responsive apparatus adapted for use as a flowmeter and comprising, in combination, a casing having first and second pressure chambers disposed therein adjacent one another, means for supplying fluid under pressure to said chambers so as to permit a pressure-differential to be established therebetween, first and second bellows located in said chambers respectively and subjected externally to the pressures therein, a passageway for establishing communication between said bellows, said bellows and said passageway being sealed off from said chambers and filled with liquid, an opening in said casing, a rod extending through said opening and having its inner end operatively coupled to one of said bellows to move therewith in response to changes in the pressure differential between said chambers, a third bellows positioned in said opening and surrounding said rod, one end of said third bellows being secured to said casing with the other end of said third bellows being secured to said rod to form a pressure-tight seal around said casing opening, at least one thin flexure strip mounted to said casing alongside said rod and positioned in a plane passing through the longitudinal axis of said rod, the movable free end of said flexure being connected to said rod for establishing a pivot axis transverse to the rod axis and about which said rod is movable in response to movement of said one bellows, said flexure being located along the longitudinal axis of said rod such that there is effectively no change in torque on said rod about said pivot axis due to variations in static pressure within said casing.

15. Differential-pressure responsive apparatus adapted for use as a flowmeter and comprising, in combination, a casing having first and second pressure chambers disposed therein adjacent one another, means for supplying fluid under pressure to said chambers so as to permit a pressure-differential to be established therebetween, first and second bellows located in said chambers respectively and subjected externally to the pressures therein, a passageway for establishing communication between said bellows, said bellows and said passageway being sealed off from said chambers and filled with liquid, an opening in said casing, a rod extending through said opening and having its inner end operatively coupled to one of said bellows to move therewith in response to changes in the pressure differential between said chambers, a third bellows positioned in said opening and surrounding said rod, one end of said third bellows being secured to said casing with the other end of said third bellows being secured to said rod to form a pressure-tight seal around said casing opening, a pair of thin flexures mounted to said casing on opposite sides of said rod with both flexures positioned in a common plane passing through the longitudinal axis of said rod, said flexures being substantially shorter in length than the longitudinal dimension of said third bellows, means for securing the free ends of said flexures to said rod for establishing a fixed pivot axis transverse to the rod axis and about which said rod is movable in response to movement of said one bellows, said flexures being located relative to the longitudinal axis of said rod such that there is effectively no change in torque on said rod about said pivot axis due to variations in static pressure within said casing.

16. Differential-pressure responsive apparatus adapted for use as a flowmeter and comprising, in combination, a casing having first and second pressure chambers disposed therein adjacent one another, means for supplying fluid under pressure to said chambers so as to permit a pressure-differential to be established therebetween, first and second bellows located in said chambers respectively and subjected externally to the pressures therein, a passageway for establishing communication between said bellows, said bellows and said passageway being sealed off from said chambers and filled with liquid, an elongated opening in said casing communicating with said passageway through one side thereof, a shaft extending through said opening, a cylindrical member secured to the inner end of said shaft and protruding into said passageway to restrict the flow of said liquid therethrough, said member being truncated along a plane canted at an angle with respect to the axis of said passageway so as to form a tapered tip, whereby rotation of said member about its longitudinal axis varies the degree of restriction on the flow of said liquid, sealing means disposed about the end of said member that is remote from said passageway, a manually-operable control device secured to the outer end of said shaft to permit said shaft and said member to be rotated to vary the restriction on the flow of said liquid, spring means disposed between said control device and said sealing means to effect a seating engagement between said sealing means and said member thereby to assure that no leakage of said liquid takes place through said opening, and a motion take-off mechanism coupled to one of said bellows for producing externally of said apparatus an indication of the amount of pressure differential between said chambers.

17. Differential-pressure responsive apparatus adapted for use as a flowmeter and comprising, in combination, first and second pressure chambers disposed adjacent one another with a dividing wall therebetween, first and second conduits for supplying fluid under pressure to said chambers respectively to permit a pressure-differential to be established therebetween, first and second bellows located in said chambers respectively and subjected externally to the pressures therein, each of said bellows comprising a plurality of centrally-apertured diaphragms positioned side-by-side, said diaphragms being secured together alternately at their inner and outer rims in direct rim-to-rim contact to form a series of expansible diaphragm units each consisting of a pair of said diaphragms, a plurality of support rings for said bellows, each of said rings being positioned within a corresponding one of said units and secured to the inner rim of one of the diaphragms thereof, said rings and inner rims being arranged to seat together when said bellows are collapsed by external pressure, one diaphragm of each of said diaphragms being curved in the region thereof adjacent the outer rim thereof and such that the individual diaphragms of each pair are separated by a small distance in said region when said bellows are collapsed, a passageway extending through said dividing wall for establishing communication between said bellows, means for sealing said bellows and said passageway from said chambers including first and second end plates for said bellows and secured to the outermost diaphragms thereof, said bellows and said passageway being filled with liquid, and a motion take-off device connected to the end plate of one of said bellows for producing an indication of the amount of pressure differential between said chambers.

18. Differential-pressure responsive apparatus adapted for use as a flowmeter and comprising, in combination, first and second pressure chambers disposed adjacent one another, first and second conduits for supplying fluid under pressure to said chambers respectively to permit a pressure-differential to be established therebetween, first and second bellows located in said chambers respectively and subjected externally to the pressures therein, each of said bellows comprising a plurality of centrally-apertured diaphragms positioned side-by-side and welded together alternately at their inner and outer rims in direct rim-to-rim contact to form a series of expansible diaphragm units each consisting of a pair of said diaphragms, a plurality of support rings for said bellows, each of said rings being positioned within one of said units and secured to the inner rim of one of the diaphragms thereof whereby said rings and inner rims seat together when said bellows are collapsed by external pressure, one diaphragm of each of said diaphragm pairs being curved in the region adjacent the inner rim thereof and one diaphragm of each of said diaphragm pairs being curved in the region adjacent the outer rim thereof, the curvatures being such that the individual diaphragms of each pair are separated by a small distance in said regions when said bellows are collapsed, a passageway for establishing communication between said bellows, said bellows and said passageway being sealed off from said chambers and filled with a substantially incompressible liquid, and a motion take-off device coupled to one of said bellows for producing an indication of the amount of pressure differential between said chambers.

References Cited by the Examiner

UNITED STATES PATENTS

| | | | |
|---|---|---|---|
| 1,988,819 | 1/1935 | Stuart | 251—122 |
| 2,078,277 | 4/1937 | Risk | 73—407 |
| 2,100,407 | 11/1937 | Peo et al. | 251—122 |
| 2,427,249 | 9/1947 | Birch | 73—407 |
| 2,431,200 | 11/1947 | Rosenberger | 74—18.1 |
| 2,513,184 | 6/1950 | Lamb | 74—18.1 |
| 2,516,825 | 7/1950 | Hejduk et al. | 251—122 |
| 2,588,118 | 3/1952 | Holmes | 251—122 |
| 2,588,678 | 3/1952 | Wills | 73—407 |
| 2,627,750 | 2/1953 | Titus | 92—38 |
| 2,632,474 | 3/1953 | Jones | 92—11 |
| 2,720,113 | 10/1955 | Statham | 73—407 |
| 2,827,716 | 3/1958 | Reese | 92—1 |
| 2,925,096 | 2/1960 | Jones | 92—11 |

SAMUEL LEVINE, *Primary Examiner.*

AUBREY D. McFAYDEN, M. H. MARLAND, RICHARD B. WILKINSON, *Examiners.*

F. WIVIOTT, O. E. PERRY, H. G. SHIELDS,
*Assistant Examiners.*